US011447630B2

(12) United States Patent
Moniruzzaman et al.

(10) Patent No.: US 11,447,630 B2
(45) Date of Patent: Sep. 20, 2022

(54) HIGH STRENGTH ADDITIVE MANUFACTURED ARTICLES

(71) Applicant: SABIC GLOBAL TECHNOLOGIES B.V., Bergen op Zoom (NL)

(72) Inventors: Mohammad Moniruzzaman, Exton, PA (US); Rabeh Elleithy, Pittsfield, MA (US); Alex Delaney, Pittsfield, MA (US); Manojkumar Chellamuthu, Mt. Vernon, IN (US)

(73) Assignee: SHPP GLOBAL TECHNOLOGIES B.V., Bergen Op Zoom (NL)

( * ) Notice: Subject to any disclaimer, the term of this patent is extended or adjusted under 35 U.S.C. 154(b) by 109 days.

(21) Appl. No.: 17/049,363

(22) PCT Filed: Apr. 29, 2019

(86) PCT No.: PCT/US2019/029637
§ 371 (c)(1),
(2) Date: Oct. 21, 2020

(87) PCT Pub. No.: WO2019/212964
PCT Pub. Date: Nov. 7, 2019

(65) Prior Publication Data
US 2021/0238411 A1 Aug. 5, 2021

(30) Foreign Application Priority Data
Apr. 30, 2018 (EP) ..................................... 18170082

(51) Int. Cl.
C08L 69/00 (2006.01)
C08L 67/02 (2006.01)
C08K 7/06 (2006.01)

(52) U.S. Cl.
CPC ................ *C08L 69/00* (2013.01); *C08K 7/06* (2013.01); *C08L 67/02* (2013.01)

(58) Field of Classification Search
None
See application file for complete search history.

(56) References Cited

U.S. PATENT DOCUMENTS

| 2013/0317150 A1 | 11/2013 | Wan et al. |
| 2014/0205814 A1 | 7/2014 | Hwang |
| 2014/0295363 A1 | 10/2014 | Sun et al. |
| 2015/0251353 A1 | 9/2015 | Rodgers et al. |
| 2016/0136887 A1 | 5/2016 | Guillemette et al. |
| 2016/0297935 A1 | 10/2016 | Reese et al. |
| 2017/0057160 A1 | 3/2017 | Duty et al. |
| 2017/0252967 A9 | 9/2017 | Guillemette et al. |

FOREIGN PATENT DOCUMENTS

| CN | 104650560 | * | 5/2015 |
| CN | 104710743 | A | 6/2015 |
| CN | 105440560 | A | 3/2016 |
| CN | 106633713 | A | 5/2017 |
| CN | 106633714 | A | 5/2017 |
| KR | 20160082436 | A | 7/2016 |
| KR | 20170081388 | A | 7/2017 |
| WO | 2013175448 | A1 | 11/2013 |
| WO | 2014072923 | A1 | 5/2014 |
| WO | 2014199322 | A2 | 12/2014 |
| WO | 2015077262 | | 5/2015 |
| WO | 2016083797 | A1 | 6/2016 |
| WO | 2017019374 | A1 | 2/2017 |
| WO | 2017123743 | A1 | 7/2017 |

OTHER PUBLICATIONS

Al-Saleh, Review of the Mechanical Properties of Carbon Nanofiber/Polymer Composites; Composites: Part A (2011) pp. 2126-2142. (Year: 2011).*
International Search Report for the corresponding International Application No. PCT/US2019/029637, International Filing Date: Apr. 29, 2019; dated Jul. 8, 2019. 6 pages.
Written Opinion for the corresponding International Application No. PCT/US2019/029637, International Filing Date: Apr. 29, 2019; dated Jul. 8, 2019. 9 pages.

\* cited by examiner

*Primary Examiner* — David J Buttner
(74) *Attorney, Agent, or Firm* — Cantor Colburn LLP (57) ABSTRACT

A composition including, based on a total weight of the composition: 30 to 60 wt % of polycarbonate; 20 to 40 wt % of polybutylene terephthalate; 5 to 40 wt % of carbon fiber; 1 to 10 wt % of an ethylene acrylic ester terpolymer; and less than 5 wt % of glass fiber.

15 Claims, 3 Drawing Sheets

HIGH STRENGTH ADDITIVE MANUFACTURED ARTICLES

CROSS-REFERENCE TO RELATED APPLICATIONS

This application is a National Stage application of PCT/US2019/029637, filed Apr. 29, 2019, which claims benefit of European Application No. 18170082.4 filed on Apr. 30, 2018, both of which are incorporated by reference herein in their entirety.

This disclosure relates to additive manufactured articles, specifically, the disclosure relates to high strength additive manufactured articles with low warp and good chemical resistance.

BACKGROUND

The strength of additive manufactured articles, especially tensile strength in the z direction, i.e., the direction in which layers are added during the additive manufactured, can be affected by poor interlayer adhesion, which can limit the applications of the additive manufactured articles. Additive manufactured articles can also suffer from high part warpage, especially additive manufactured articles printed with semicrystalline polymers, which can provide chemical resistance.

U.S. Patent Application Publication No. 2016/0136887 A1 relates to 3D printer inputs including filaments comprising separated layers or sections. The inputs including filaments may be prepared by coextrusion, microlayer coextrusion or multicomponent/fractal coextrusion. The inputs and filaments may enable layering or combining different materials simultaneously through one or more nozzles during the so-called 3D printing process. The techniques may facilitate smaller layer sizes (milli, micro, and nano) different layer configurations as well as the potential to incorporate materials that would otherwise not be usable in standard 3D printer methods.

CN104710743 discloses a polycarbonate/polybutylene terephthalate (PC/PBT) composite material. Glass fiber and nano carbon fiber in the composite material allegedly have synergetic strengthening and toughening functions.

U.S. Patent Application Publication No. 2013/0317150 A1 is directed to a composition comprising a polyester, polycarbonate, organopolysiloxane-polycarbonate block copolymer, organophosphorus flame retardant, fluorinated polyolefin, and one or more additives. In particular, a thermoplastic composition comprises, based on the total weight of the composition: (a) from more than 12 to 30 wt. % of a polyester; (b) from 21.7 to 81.3 wt. % of a polycarbonate; (c) from 5 to less than 60 wt. % of an organopolysiloxane-polycarbonate block copolymer comprising from 10 to 50 wt. % of polydiorganosiloxane units; (d) from 1 to 20 wt. % of an organophosphorus flame retardant; (e) from 0.02 to 5 wt. % of a fluorinated polyolefin; (f) optionally, from 0.25 to 10 wt. % of an impact modifier selected from the group consisting of elastomer-based graft copolymers and elastomer-based block copolymers; and (g) from 0.1 to 5 wt. % of an additive composition comprising an antioxidant, a quencher, an ultraviolet light stabilizer, or a combination thereof.

It would be desirable to provide additive manufactured articles with improved strength in the z direction.

SUMMARY

Disclosed herein are compositions and articles made therefrom.

In an embodiment, the composition can comprise, based on a total weight of the composition: 30 to 60 wt % of polycarbonate; 20 to 40 wt % of polybutylene terephthalate; 5 to 40 wt % of carbon fiber; 1 to 10 wt % of an ethylene acrylic ester terpolymer; and less than 5 wt % of glass fiber; wherein the total weight of the composition is 100 wt %.

BRIEF DESCRIPTION OF THE DRAWINGS

The following figures are exemplary embodiments.

FIG. 1b is a top view of the part illustrated in FIG. 1a.

DETAILED DESCRIPTION

This disclosure relates to additive manufactured articles, e.g., articles made from thermoplastic compositions containing polycarbonate (PC), polybutylene terephthalate (PBT), carbon fibers (CF), an ethylene acrylic ester terpolymer (hereinafter "terpolymer"), and optionally additives (such as compatibilizers, stabilizers, and minerals). This composition enables the production of additive manufactured articles with improved warp and chemical resistance.

A synergistic effect has been discovered when using the compositions containing polycarbonate, polybutylene terephthalate, carbon fibers, and the terpolymer (hereinafter "the PC/PBT/CF/terpolymer composition"), for additive manufacturing. Namely, the use of the composition to form an additive manufactured article (also referred to herein as a printed article) improves z direction strength. This was particularly surprising as the effect is not attained when using this composition to form an injection molded article.

The printed articles containing the PC/PBT/CF/terpolymer composition also provide desirable chemical resistance and low warpage. The printed articles can exhibit z direction tensile strength of at least 15 megapascals (MPa), preferably at least 20 MPa, as determined by a modified ASTM D 638 test method.

Dicarboxylic acids (e.g., aliphatic dicarboxylic acids, alicyclic dicarboxylic acids, aromatic dicarboxylic acids, and combinations thereof) and diols (e.g., aliphatic diols, alicyclic diols, aromatic diols, and combinations thereof) can be used to prepare polyester, such as the PBT. As used herein, polybutylene terephthalate can be used interchangeably with poly(1,4-butylene terephthalate). Chemical equivalents of dicarboxylic acids (e.g., anhydrides, acid chlorides, acid bromides, carboxylate salts, or esters) and chemical equivalents of diols (e.g., esters, preferably $C_1$-$C_8$ esters such as acetate esters) may also be used to prepare the PBT.

Aromatic dicarboxylic acids that can be used to prepare the polyesters include, but are not limited to, isophthalic acid, terephthalic acid, 1,2-di(p-carboxyphenyl)ethane, 4,4'-dicarboxydiphenyl ether, 4,4'-bisbenzoic acid, and the like, and 1,4- or 1,5-naphthalene dicarboxylic acids and the like. A combination of isophthalic acid and terephthalic acid can be used. The weight ratio of isophthalic acid to terephthalic acid may be, for example, 91:9 to 2:98, or 25:75 to 2:98. Dicarboxylic acids containing fused rings that can be used to prepare the polyesters include, but are not limited to, 1,4-, 1,5-, and 2,6-naphthalenedicarboxylic acids. Exemplary cycloaliphatic dicarboxylic acids include, but are not limited to, decahydronaphthalene dicarboxylic acids, norbornene dicarboxylic acids, bicyclooctane dicarboxylic acids, and 1,4-cyclohexanedicarboxylic acids.

Aliphatic diols that can be used to prepare the polyesters include, but are not limited to, 1,2-ethylene glycol, 1,2- and 1,3-propylene glycol, 2,2-dimethyl-1,3-propane diol, 2-ethyl-2-methyl-1,3-propane diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol and its cis- and trans-isomers, triethylene glycol, 1,10-decane diol, and the like, and combinations thereof. The diol may be ethylene or 1,4-butylene diol. The diol may be 1,4-butylene diol. The diol may be ethylene glycol with small amounts (e.g., 0.5 to 5.0 percent) of diethylene glycol. Aromatic diols that can be used to prepare the polyesters include, but are not limited to, resorcinol, hydroquinone, pyrocatechol, 1,5-naphthalene diol, 2,6-naphthalene diol, 1,4-naphthalene diol, 4,4'-dihydroxybiphenyl, bis(4-hydroxyphenyl)ether, bis(4-hydroxyphenyl)sulfone, and the like, and combinations thereof.

In some embodiments, the PBT that is obtained by polymerizing a glycol component comprising at least 70 mole percent, preferably at least 80 mole percent, of tetramethylene glycol (1,4-butanediol), and an acid component comprising at least 70 mole percent, preferably at least 80 mole percent, of terephthalic acid or polyester-forming derivatives thereof. Commercial examples of PBT include those available as VALOX™ 315 Resin and VALOX™ 195 Resin, manufactured by SABIC.

In some embodiments, the PBT comprises a modified PBT, that is, a PBT derived in part from PET, for example recycled PET from used soft drink bottles. The PET-derived PBT polyester (referred to herein for convenience as a "modified PBT") can be derived from a PET component such as PET, a PET copolymer, or a combination thereof. The modified PBT can further be derived from biomass-derived 1,4-butanediol, e.g., corn-derived 1,4-butanediol or a 1,4-butanediol derived from a cellulosic material. Unlike conventional molding compositions containing virgin PBT (PBT that is derived from 1,4-butanediol and terephthalic acid monomers), the modified PBT contains units derived from ethylene glycol and isophthalic acid. Use of modified PBT can provide a valuable way to effectively use underutilized scrap PET (from post-consumer or post-industrial streams) in PBT thermoplastic molding compositions, thereby conserving non-renewable resources and reducing the formation of greenhouse gases, e.g., carbon dioxide.

The modified PBT can have at least one residue derived from the PET component. Such residue can be selected from the group consisting of ethylene glycol residues, diethylene glycol residues, isophthalic acid residues, antimony-containing residues, germanium-containing residues, titanium-containing residues, cobalt-containing residues, tin-containing residues, aluminum, aluminum-containing residues, 1,3-cyclohexane dimethanol residues, 1,4-cyclohexane dimethanol residues, alkali salts and alkaline earth metal salts including calcium and magnesium and sodium and potassium salts, phosphorous-containing residues, sulfur-containing residues, naphthalene dicarboxylic acid residues, 1,3-propanediol residues, and combinations thereof.

"Polycarbonate" as used herein means a homopolymer or copolymer having repeating structural carbonate units of the formula (1)

wherein at least 60 percent of the total number of $R^1$ groups are aromatic, or each $R^1$ contains at least one $C_{6-30}$ aromatic group. Polycarbonates and their methods of manufacture are known in the art, being described, for example, in WO 2013/175448 A1, US 2014/0295363, and WO 2014/072923. Polycarbonates are generally manufactured from bisphenol compounds such as 2,2-bis(4-hydroxyphenyl) propane ("bisphenol-A" or "BPA"), 3,3-bis(4-hydroxyphenyl) phthalimidine, 1,1-bis(4-hydroxy-3-methylphenyl)cyclohexane, or 1,1-bis(4-hydroxyphenyl)-3,3,5-trimethylcyclohexane (isophorone), or a combination comprising at least one of the foregoing bisphenol compounds can also be used. In a specific embodiment, the polycarbonate is a homopolymer derived from BPA; a copolymer derived from BPA and another bisphenol or dihydroxy aromatic compound such as resorcinol; or a copolymer derived from BPA and optionally another bisphenol or dihydroxyaromatic compound, and further comprising non-carbonate units, for example aromatic ester units such as resorcinol terephthalate or isophthalate, aromatic-aliphatic ester units based on $C_6$-20 aliphatic diacids, polysiloxane units such as polydimethylsiloxane units, or a combination comprising at least one of the foregoing.

The polycarbonate can be present in the composition in an amount of 30 to 60 weight percent (wt %), for example, 35 to 55 wt %, preferably 35 to 50 wt %. The polycarbonate can have an intrinsic viscosity, as determined in chloroform at 25° C. of about 0.3 to about 1.5 dl/g, preferably about 0.45 to about 1.0 dl/g. The polycarbonate can be branched or unbranched. In an embodiment, the polycarbonate is a linear polycarbonate. The polycarbonate can have a weight average molecular weight of about 10,000 to about 200,000 Daltons, preferably about 20,000 to about 100,000 Daltons as measured by gel permeation chromatography, using a crosslinked styrene-divinylbenzene column and calibrated to bisphenol A homopolycarbonate references.

The polycarbonate can be BPA polycarbonate commercially available under the trade designation LEXAN™ from SABIC, such as LEXAN™ 104 polycarbonate. For example, the polycarbonate can have a number average molecular weight of 10,000 to about 15,000 Daltons, for example, about 12,610, and a weight average molecular weight of 25,000 to about 30,000 Daltons, for example, about 28,860 Daltons.

The carbon fiber can be present in the composition in an amount of 5 to 40 wt %, for example, 10 to 30 wt %, preferably 15 to 25 wt %, based on the total weight of the composition. Carbon fibers can be classified according to their diameter, morphology, and degree of graphitization (morphology and degree of graphitization being interrelated). Carbon fibers can be produced, for example, by pyrolysis of organic precursors in fibrous form, including phenolics, polyacrylonitrile (PAN), or pitch.

The carbon fibers can have a diameter of at least 3 micrometers to 12 micrometers, preferably 3 micrometers to 10 micrometers, 5 micrometers to 9 micrometers, or 5 micrometers to 7 micrometers. The carbon fibers can have a length of 0.1 millimeters (mm) to 6 millimeters, preferably 0.2 micrometers to 3 micrometers, or 0.3 millimeters to 1 millimeter. The carbon fibers can have a tensile modulus of 28 to 48 megapounds per square inch (193 to 331 gigapascals (GPa)), preferably 32 to 45 megapounds per square inch (221 to 310 gigapascals), more preferably 34 to 42 megapounds per square inch (228 to 290 gigapascals). The carbon fibers can have a tensile strength of 400 to 1,200 kilopounds per square inch (2,758 to 8,274 MPa), preferably 500 to 1,000 kilopounds per square inch (3,447 to 6,895 MPa), more preferably 700 to 900 kilopounds per square inch (4,826 to 6,205 MPa).

The ethylene acrylic ester terpolymers can include various acrylic esters (e.g., methyl, ethyl, or butyl acrylate) and third monomers (e.g., maleic anhydride (MAH) or glycidyl methacrylate (GMA)). For example, the following are structures of random ethylene vinyl acetate-maleic anhydride terpolymers obtained by high pressure radical polymerization.

R: $CH_3$ or $C_2H_5$ or $C_4H_9$

Ethylene acrylic ester terpolymers can be characterized by a reactivity, crystallinity, and fluidity. Ethylene-vinyl acetate can react with other functional polymers to create chemical bonds, which can increase adhesion properties, heat resistance, or long term aging properties, for example, due to the presence of glycidyl methacrylate or maleic anhydride groups. Acrylic ester can decrease the crystallinity of the polymer. Acrylic ester can also help maintain desirable mechanical properties. Acrylic ester additionally can provide excellent thermal stability with limited viscosity change and discoloration (when formulated with a suitable antioxidant). Maleic anhydride can increase adhesion to polar substrates and can allow the creation of chemical bonds onto substrates such as, for example, metal, polymers, metallized products, cellulosic substrates, and rubber.

With specific reference to a random terpolymer of ethylene, acrylic ester, and glycidyl methacrylate, the acrylic ester may provide softness and polarity and may lead to high flexibility (low crystallinity) and high impact absorption behavior, while the glycidyl methacrylate may provide reactivity, leading to desirable dispersion during melt mixing with thermoplastics. An exemplary ethylene acrylic ester glycidyl methacrylate terpolymer is LOTADER™ AX8900, and an exemplary ethylene acrylic ester maleic anhydride terpolymer is LOTADER™ 4503, both from Arkema. The terpolymer can be present in the composition in an amount of 1 to 10 wt %, preferably 3 to 10 wt %, more preferably 5 to 10 wt %, and more preferably 5 to 7 wt %, based on the total weight of the composition.

The composition can optionally further include additive(s), such as compatibilizer (e.g., an epoxy chain extender or an epoxy), mold release agent, process stabilizer (e.g., antioxidant, heat stabilizer, light stabilizer), plasticizer, flame retardant, lubricant, antistatic agent, colorant (e.g., a dye or pigment), radiation stabilizer, anti-drip agent (e.g., a polytetrafluoroethylene (PTFE)-encapsulated styrene-acrylonitrile copolymer (TSAN)), or a combination comprising one or more of the foregoing. For example, a combination of a heat stabilizer and ultraviolet light stabilizer can be used.

Examples of mold release agents include both aliphatic and aromatic carboxylic acids and their alkyl esters, for example, stearic acid, behenic acid, pentaerythritol tetrastearate, glycerin tristearate, and ethylene glycol distearate. Polyolefins such as high-density polyethylene, linear low-density polyethylene, low-density polyethylene, and similar polyolefin homopolymers and copolymers can also be used a mold release agents. Some compositions use pentaerythritol tetrastearate, glycerol monosterate, a wax, or a poly alpha olefin. The mold release agent can be pentaerythrityl tetrastearate.

Heat stabilizer additives include organophosphites (e.g., triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate Light stabilizers include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis(4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec) or combinations comprising at least one of the foregoing light stabilizers.

Antioxidant additives include organophosphites such as tris(nonylphenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. The process stabilizer in the form of an antioxidant can be 3,5-di-tert-butyl-4-hydroxy-hydrocinnamic acid, tetraester with pentaerythritol (Chemical Abstract Registry No. 6683-19-8), IRGANOX™ 1010 from Ciba-Geigy.

The article can be manufactured with an additive manufacturing process. Additive manufacturing processes, or three dimensional (3-D) printing, are generally defined as processes that build a solid object from a series of layers with each layer formed on top of the previous layer. For example, 3-D printing refers to a variety of processes including fused deposition modeling or fused filament fabrication, e.g., large format additive manufacturing.

Fused deposition modeling or fused filament fabrication involves building a part or article layer-by-layer by heating thermoplastic material to a semi liquid state and extruding it according to computer-controlled paths. Fused deposition modeling utilizes a modeling material and a support material. The modeling material comprises the finished piece, and the support material comprises scaffolding that can be washed away or dissolved when the process is complete. The process involves depositing material to complete each layer before the base moves along the z-axis and the next layer begins. As used herein, the z axis is the interlayer axis, the x-axis is the axis along the bead, and the y-axis if the axis across the bead (see FIG. 2), and the z direction strength is the strength along the z-axis.

Examples

TABLE 1

| Material | Description | Supplier |
|---|---|---|
| SABIC VALOX ™ 315 | polybutylene terephthalate (melt viscosity of about 8500 poise), | SABIC ™ |
| SABIC LEXAN ™ 104 | Polycarbonate | SABIC ™ |
| TOHO TENAX ™ HT C483 carbon fiber | Carbon fiber, Tensile Modulus 240 GPa, chopped length 6 mm, average diameter 7 micrometers | Toho Tenax Co., Ltd. |
| LOTADER ™ AX8900 | Random terpolymer of ethylene, acrylic ester, and glycidyl methacrylate | Arkema |
| GLYCOLUBE ™ P(ETS) | Mold release agent (Pentaerythrityl tetrastearate) | Lonza Inc. |
| IRGANOX ™ 1010 | Process stabilizer (Pentaerythritol tetrakis(3-(3,5-di-tert-butyl-4-hydroxyphenyl)propionate)) | Ciba-Geigy |
| Johns Manville JM 718 | Glass fiber, diameter 13 micrometer, chopped length 6 mm, Tensile Modulus 9.45 pascals (Pa) | Johns Manville |

Figure 1A:
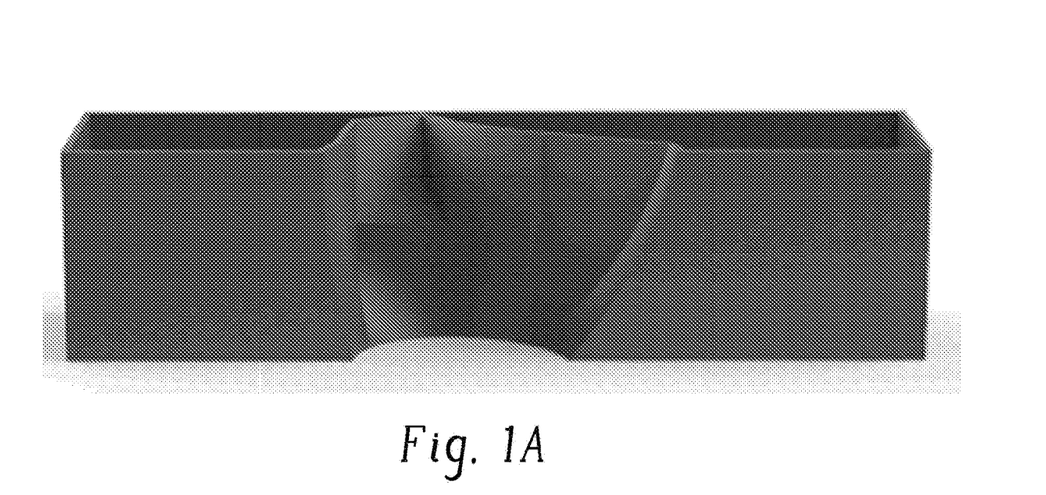
FIG. 1a is a front view of an embodiment of a printed part as formed in the Examples.
Figure 1B:
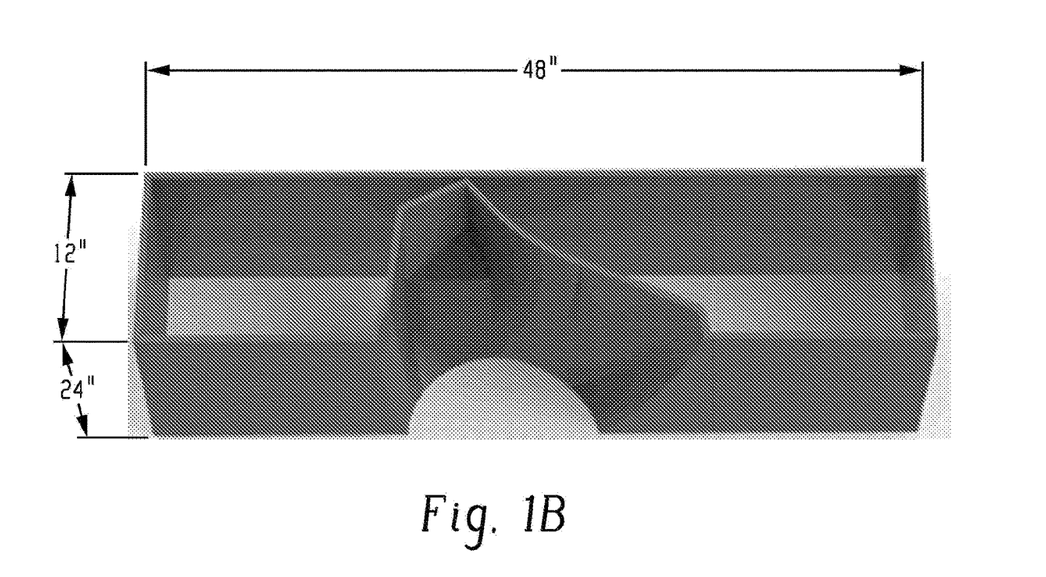

A large format additive manufacturing machine (BAAM™, manufactured by Cincinnati Incorporated) was used to print 12 inch width×48 inch length×24 inch height (30.5 centimeter (cm) width×121.9 cm length×61.0 cm height) single-wall box-shaped parts from the compositions listed in Table 2. A printed part is shown in FIG. 1a which is a front view, while FIG. 1b is a top view. The box was designed in a way so that the back wall can be used to collect tensile specimens while the front wall (with angle changes in the z and xy direction in the middle) can be used to assess the printability of the parts.

TABLE 2

| | | Compositions | | | | |
|---|---|---|---|---|---|---|
| Component | Generic Description | C1 (wt %) | C2 (wt %) | C3 (wt %) | C4 (wt %) | Ex1 (wt %) |
| SABIC VALOX ™ 315 | Polybutylene terephthalate | 79.8 | | 32 | 30 | 30 |
| SABIC LEXAN ™ 104 | Polycarbonate | | 79.8 | 47.8 | 44.8 | 44.8 |
| TOHO TENAX HT C483 carbon fiber | Carbon fiber | 20 | 20 | 20 | | 20 |
| Lotader AX8900 | Random terpolymer of ethylene, acrylic ester, and glycidyl methacrylate | | | | 5 | 5 |
| Lonza GLYCOLUBE ™ P(ETS) | Mold release agent | 0.1 | 0.1 | 0.1 | 0.1 | 0.1 |
| Ciba-Geigy IRGANOX ™ 1010 | Process stabilizer | 0.1 | 0.1 | 0.1 | 0.1 | 0.1 |
| Johns Manville JM 718 | Glass fiber | | | | 20 | |

To print the box-shaped parts, the temperature profile of the extruder, which extruded a bead, was in the range of 190° C. to 260° C. for the polybutylene terephthalate (PBT)/carbon fiber (CF) samples, and 250° C. to 290° C. for the polycarbonate (PC)/CF and PC/PBT/CF samples. The temperature was gradually increased along the length of the extruder. The PBT/CF samples were processed at lower temperature than the PC/CF and PC/PBT/CF samples as the glass transition temperature (Tg) of PBT is less than that of PC. The print speed was approximately 4 inches/second and the screw speed was approximately 100 revolutions per minute (rpm). The melt pressure was maintained at less than 2,000 pounds per square inch (psi). Comparative composition C4 included glass fiber (GF) rather than CF.

Figure 2:
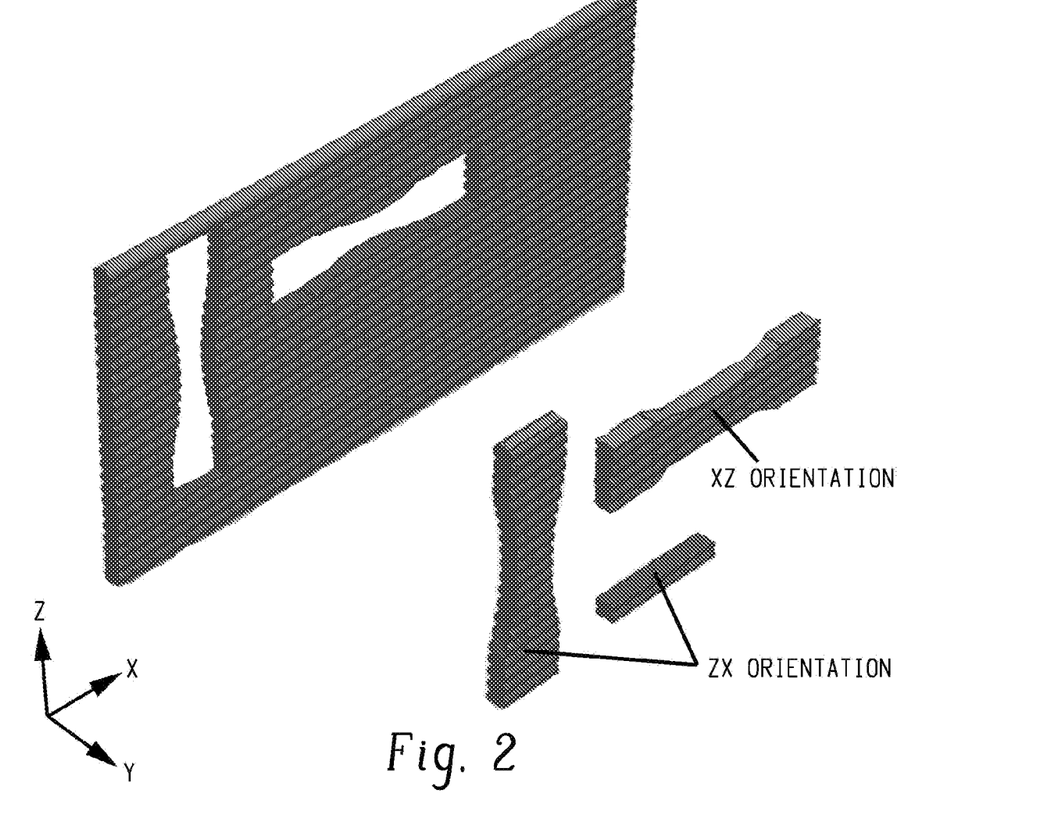
FIG. 2 shows tensile samples machined from a side of the printed part shown in FIGS. 1a and 1b.

Dumbbell shaped tensile samples were machined from the printed articles using a computer numerical control (CNC) waterjet cutter. The samples were created from each of the compositions in two directions: horizontal, with the printed beads parallel to the tensile axis (also referred to as the xz orientation), and vertical, with the printed beads perpendicular to the tensile axis (also referred to as the zx orientation). The specimens' orientations are depicted in FIG. 2. The x direction indicated in FIG. 2 corresponds to a direction of movement of the extruder during the printing.

The dumbbell tensile samples were conditioned at drying conditions at 100° C. for 4 hours in dry air followed by a normalization period at 23° C. and 50% relative humidity (RH) for at least eight hours before testing. An MTS EXCEED E45 electromechanical load frame was used to strain the samples, at a rate of 5 millimeters per minute (mm/min), in tension mode up to fracture. The force-displacement data was collected for further analysis. Five (5) samples from each composition and direction were tested.

The averaged results are provided in Table 3. Surface appearance determinations were made by naked eye and aided by a microscope.

TABLE 3

| Property | Test Standard | Compositions | | | | |
|---|---|---|---|---|---|---|
| | | C1 | C2 | C3 | C4 | Ex1 |
| Surface appearance | | Rough | Smooth | Rough | Moderate | Smooth |
| Corner lift in inches (cm) | Custom | 0.42 (1.07) | 0.23 (0.58) | 0.28 (0.71) | 0.45 (1.14) | 0.13 (0.33) |
| Tensile strength, z direction (MPa) | Modified ASTM D 638 | 4 | 27 | 21 | 18 | 37 |

Figure 3:
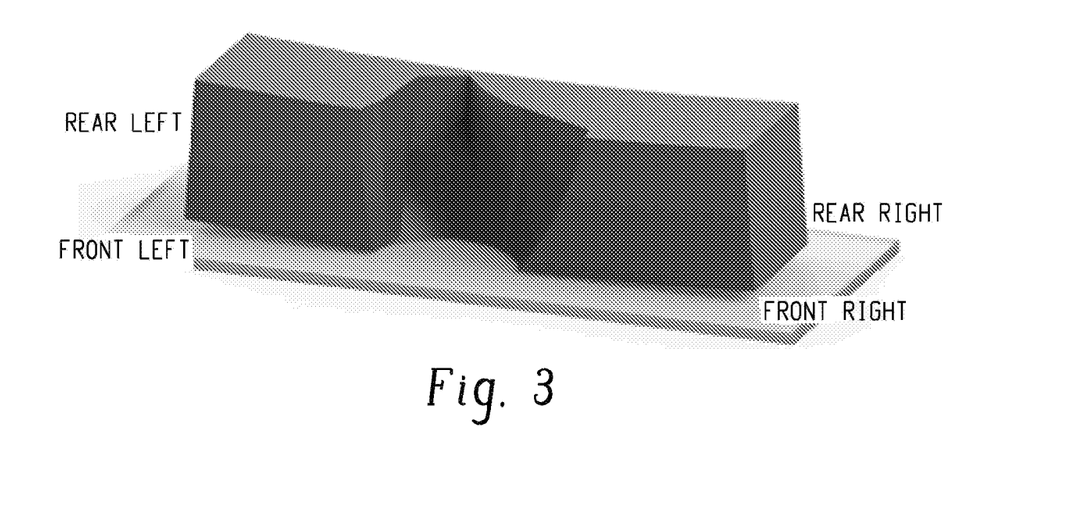
FIG. 3 illustrates part warpage for an embodiment of a printed part.

Regarding the Corner lift measurements provided in Table 3, reference is made to FIG. 3, which is provided only for purposes of illustration. The Corner lift listed in Table 3 was an average of measured values for four corners of the printed part, and corresponds to a warpage of the part.

Figure 4:
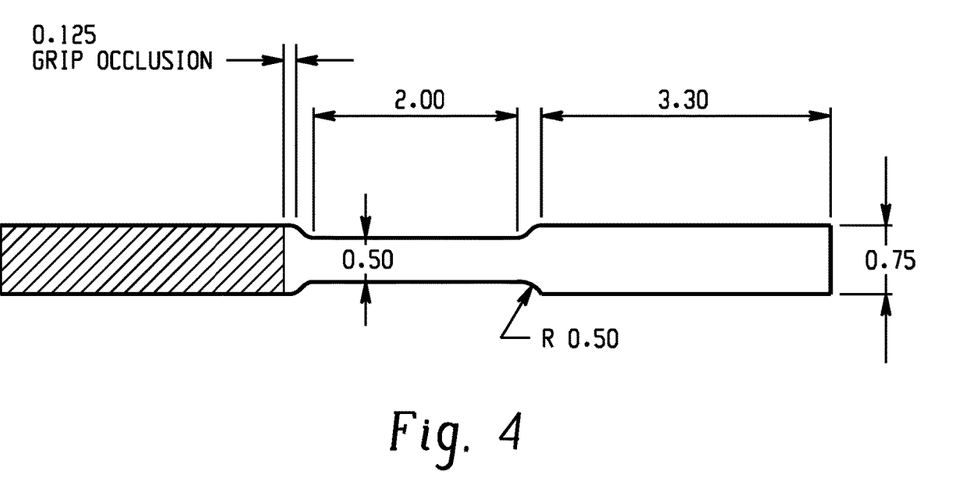
FIG. 4 illustrates the dimensions of a test specimen used in a modified ASTM D 638 test method referenced herein.

As used herein, the "modified ASTM D 638" test method used the test standard set forth in ASTM D 638 2014 but used a test specimen varying from the standard test method of ASTM D 638 2014. FIG. 4 illustrates the dimensions of the test specimen used in the modified ASTM D 638 test method referenced herein.

Parts printed from the composition Ex1 exhibited improved warpage and tensile strength as compared to the comparative compositions including: PBT/CF without the terpolymer (comparative composition 1, "C1"); PC/CF without the terpolymer (comparative composition 2, "C2"): PBT/PC/CF without the terpolymer (comparative composition 3, "C3"); and PBT/PC/GF (comparative composition 4, "C4"). In particular, C1 did not exhibit good printability. The interlayer adhesion in the printed part was poor resulting in a poor z direction tensile strength of 4 MPa. C2 exhibited a z direction tensile strength of 27 MPa, but also exhibited a corner lift of 0.23 inches (0.58 cm). Z direction tensile strength of the articles printed from composition 1 (i.e., the PC/PBT/CF terpolymer composition) were higher than the z direction tensile strengths of articles printed from compositions containing glass fiber (C4), no terpolymer (C3), only polycarbonate and carbon fibers (C2), or only polybutylene terephthalate and carbon fibers (C1).

In particular, the tensile strength in the z direction of C1 was 4 MPa and the tensile strength in the z direction of C2 was 27 MPa. Addition of polybutylene terephthalate to C2 would expectedly negatively impact the tensile strength in the z direction of a part printed therefrom. As expected, therefore, adding the polybutylene terephthalate to the polycarbonate and CF resulted in a tensile strength between that of C1 and C2. Adding the terpolymer to the polycarbonate/polybutylene terephthalate composition produced a lower tensile strength than the polycarbonate/polybutylene terephthalate/carbon fiber (see C4 versus C3). Seemingly, adding the terpolymer to the PC/PCB/CF composition would be expected to result in a tensile strength between that of C3 and C4, i.e., between 5 and 26 MPa. However, a synergy was discovered between the polybutylene terephthalate, polycarbonate, terpolymer, and carbon fiber. That composition resulted in a surprising improvement in the tensile strength in the z direction. Specifically, the tensile strength in the z direction of composition 1 was 37 MPa.

The synergistic effect of using the PC/PBT/CF terpolymer composition, and resultant desirable warpage and tensile strength, was particularly surprising as the effect was not attained when using the composition to form an injection molded article. In particular, Table 4 provides tensile strength data for a regular tensile bar and weld line strength data for a double gated tensile bar manufactured by injection molding using comparative compositions C1 and C2 and composition Ex1. In large format additive manufacturing layers in the z direction as well as the double gated tensile bar, fibers do not cross from one layer to another layer.

TABLE 4

| | C1 | C2 | Ex1 |
|---|---|---|---|
| Tensile strength of injection molded sample (MPa) | 147 | 106 | 134 |
| Weld line strength of injection molded sample (MPa) | 60 | 67.9 | 38.8 |

For the injection molded samples, tensile strength of the tensile bar formed using composition Ex1 (134 MPa) was between the tensile strength of the tensile bars formed using comparative compositions C1 and C2 (147 and 106 MPa, respectively). However, weld line strength of the double gated tensile bar formed by injection molding using composition of Ex1 (38.8 MPa) was worse than the weld line strength of both the double gated tensile bars formed by injection molding using comparative compositions C1 and C2 (60 and 37.9 MPa, respectively). Thus, both the tensile strength and the weld line strength of injection molded samples formed using the PC/PBT/CF terpolymer composition were not improved over injection molded samples formed using comparative composition C1 and comparative composition C2.

A large format additive manufacturing machine (BAAM™, manufactured by Cincinnati Incorporated) was used to print 12 inch width×48 inch length×24 inch height (30.5 centimeter (cm) width×121.9 cm length×61.0 cm height) single-wall box-shaped parts from the compositions listed in Table 5, similar to the printed parts of C1-C4 and Ex1.

TABLE 5

| | | Compositions | |
|---|---|---|---|
| Component | Generic Description | C5 (wt %) | C6 (wt %) |
| SABIC VALOX ™ 315 | Polybutylene terephthalate | 30 | 30 |
| SABIC LEXAN ™ 104 | Polycarbonate | 50 | 50 |
| TOHO TENAX HT C483 carbon fiber | Carbon fiber | 5 | 5 |
| Compatibilizer | Ethylene acrylic ester terpolymer | 3 | 3 |
| IRGANOX ™ 1010 | Process stabilizer | 0.1 | 0.1 |
| Johns Manville JM 718 | Glass fiber | 11 | 5 |

To print the box-shaped parts, the temperature profile of the extruder, which extruded a bead, was in the range of 250° C. to 290° C. The temperature was gradually increased along the length of the extruder. The print speed was approximately 4 inches per second and the screw speed was approximately 100 revolutions per minute (rpm). The melt pressure was maintained at less than 2,000 psi (13.8 MPa).

Dumbbell shaped tensile samples were machined from the printed articles using a CNC waterjet cutter. The samples were created from each of the compositions in two directions: horizontal, with the printed beads parallel to the tensile axis (also referred to as the xz orientation), and vertical, with the printed beads perpendicular to the tensile axis (also referred to as the zx orientation), similar to the printed parts of C1-C4 and Ex1.

The dumbbell tensile samples were conditioned at drying conditions at 100° C. for 4 hours in dry air followed by a normalization period at 23° C. and 50% RH for at least eight hours before testing. An MTS EXCEED E45 electromechanical load frame was used to strain the samples, at a rate of 5 millimeters per minute (mm/min), in tension mode up to fracture. The force-displacement data was collected for further analysis. Five (5) samples from each composition and direction were tested. The averaged results are provided in Tables 6 and 7.

TABLE 6

| Property - x direction | Test Standard | Compositions | |
| --- | --- | --- | --- |
| | | C5 | C6 |
| Tensile Strength (MPa) | Modified ASTM D 638 | 63.5 | 65.7 |
| Strain (%) | Modified ASTM D 638 | 1.70 | 1.38 |
| Stiffness (GPa) | Modified ASTM D 638 | 4.7 | 5.9 |

TABLE 7

| Property - z direction | Test Standard | Compositions | |
| --- | --- | --- | --- |
| | | C5 | C6 |
| Tensile Strength (MPa) | Modified ASTM D 638 | 17.6 | 16.0 |
| Strain (%) | Modified ASTM D 638 | 0.79 | 0.70 |
| Stiffness (GPa) | Modified ASTM D 638 | 2.5 | 2.47 |

Parts printed from compositions including glass fiber in addition to carbon fiber exhibited decreased tensile strength. For example, parts printed from each of comparative composition 5 ("C5") and comparative composition 6 ("C6") exhibited tensile strength in the z direction of less than 20 MPa, as determined by the modified ASTM D 638 test method. Specifically, a part printed from C6, which included 5 wt % glass fiber, exhibited a tensile strength in the z direction of 16.0 MPa, as determined by the modified ASTM D 638 test method, and a part printed from C5, which included an increased amount of 11 wt % glass fiber, exhibited a tensile strength in the z direction of 17.6 MPa, as determined by the modified ASTM D 638 test method.

Ex1, which included 30 to 60 wt % polycarbonate (specifically 44.8 wt %); 20 to 40 wt % polybutylene terephthalate (specifically 30 wt %); 5 to 40 wt % carbon fiber (specifically 20 wt %); 1 to 10 wt % ethylene acrylic ester terpolymer (specifically 5 wt %); and less than 5 wt % glass fiber (specifically 0 wt %), exhibited a tensile strength in the z direction of 37 MPa, as determined by the modified ASTM D 638 test method.

Glass fiber can be present in the composition in an amount of less than 5 wt %, for example, less than 3 wt %, or less than 1 wt %, based on the total weight of the composition. The composition can be free of glass fiber. Preferably, all fibers in the composition are carbon fibers.

The various embodiments are illustrated by the following aspects.

Aspect 1: A composition comprising, based on a total weight of the composition: 30 to 60 wt % of polycarbonate; 20 to 40 wt % of polybutylene terephthalate; 5 to 40 wt % of carbon fiber; 1 to 10 wt % of an ethylene acrylic ester terpolymer; and less than 5 wt % of glass fiber.

Aspect 2: The composition of Aspect 1, comprising less than 3 wt % of glass fiber, preferably less than 1 wt % of glass fiber, based on the total weight of the composition.

Aspect 3: The composition of any one of the preceding aspects, wherein the composition is free of glass fiber.

Aspect 4: The composition of any one of the preceding aspects, comprising polycarbonate in an amount of 35 to 50 wt % based on the total weight of the composition.

Aspect 5: The composition of any one of the preceding aspects, comprising polybutylene terephthalate in an amount of 25 to 35 wt %, based on the total weight of the composition.

Aspect 6: The composition of any one of the preceding aspects, comprising carbon fiber in an amount of 15 to 25 wt %, based on the total weight of the composition.

Aspect 7: The composition of any one of the preceding aspects, comprising ethylene acrylic ester terpolymer in an amount of 5 to 7 wt %, based on the total weight of the composition.

Aspect 8: The composition of any one of the preceding aspects, comprising, based on the total weight of the composition, carbon fiber in an amount of 10 to 30 wt %, and ethylene acrylic ester terpolymer in an amount of 5 to 7 wt %.

Aspect 9: The composition of any one of the preceding aspects, wherein the carbon fiber has a length of 0.1 millimeters to 6 millimeters, preferably 0.3 millimeters to 1 millimeter.

Aspect 10: The composition of any one of the preceding aspects, wherein the carbon fiber has a diameter of 3 micrometers to 12 micrometers, preferably 5 micrometers to 9 micrometers, or 5 micrometers to 7 micrometers.

Aspect 11: The composition of any one of the preceding aspects, wherein the composition comprises carbon fibers having a tensile modulus of 28 to 48 megapounds per square inch (193 to 331 gigapascals), preferably 32 to 45 megapounds per square inch (221 to 310 gigapascals), more preferably 34 to 42 megapounds per square inch (228 to 290 gigapascals).

Aspect 12: The composition of any one of the preceding aspects, wherein the composition comprises carbon fibers having a tensile strength of 400 to 1,200 kilopounds per square inch (2,758 to 8,274 megapascals), preferably 500 to 1,000 kilopounds per square inch (3,447 to 6,895 megapascals), more preferably 700 to 900 kilopounds per square inch (4,826 to 6,205 megapascals).

Aspect 13: A method of forming an article, the method comprising three dimensional printing using the composition of any one of the preceding claims.

Aspect 14: An article formed by using the composition of any one of Aspects 1-12.

Aspect 15: The article of Aspect 14, wherein the article exhibits a tensile strength in the first direction of at least 15 megapascals, preferably at least 20 megapascals, as determined by a modified ASTM D 638 test method.

Aspect 16: The article of Aspect 14 or Aspect 15, wherein the article exhibits improved tensile strength as compared to a composition comprising a same amount of polycarbonate, a same amount of polybutylene terephthalate, or a combination thereof, and a same amount of carbon fiber, without an ethylene acrylic ester terpolymer.

Aspect 17: The article of any one of Aspects 14-15, wherein the article exhibits improved warpage as compared to a composition comprising a same amount of polycarbonate, a same amount of polybutylene terephthalate, or a combination thereof, and a same amount of carbon fiber, without an ethylene acrylic ester terpolymer.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Or" means "and/or" unless clearly indicated otherwise by context. The terms "first," "second," and the like, "primary," "secondary," and the like, as used herein do not denote any order, quantity, or importance, but rather are used to distinguish one element from another.

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. As used herein, the total amount of the components in the composition is 100 wt %.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless defined otherwise, technical and scientific terms used herein have the same meaning as is commonly understood by one of skill in the art to which this disclosure belongs. A "combination" is inclusive of blends, mixtures, alloys, reaction products, and the like.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A composition comprising, based on a total weight of the composition:
   30 to 60 wt % of polycarbonate;
   20 to 40 wt % of polybutylene terephthalate;
   5 to 40 wt % of carbon fiber having a diameter of 3 micrometers to 12 micrometers;
   1 to 10 wt % of an ethylene acrylic ester terpolymer; and less than 5 wt % of glass fiber;
   wherein the total weight of the composition is 100 wt %.

2. The composition of claim 1, comprising less than 3 wt % of glass fiber, based on the total weight of the composition.

3. The composition of claim 1, wherein the composition is free of glass fiber.

4. The composition of claim 1, comprising polycarbonate in an amount of 35 to 50 wt %, based on the total weight of the composition.

5. The composition of claim 1, comprising polybutylene terephthalate in an amount of 25 to 35 wt %, based on the total weight of the composition.

6. The composition of claim 1, comprising carbon fiber in an amount of 15 to 25 wt %, based on the total weight of the composition.

7. The composition of claim 1, comprising ethylene acrylic ester terpolymer in an amount of 5 to 7 wt %, based on the total weight of the composition.

8. The composition of claim 1, comprising, based on the total weight of the composition, carbon fiber in an amount of 10 to 30 wt %, and ethylene acrylic ester terpolymer in an amount of 5 to 7 wt %.

9. The composition of claim 1, wherein the carbon fiber has a length of 0.1 millimeters to 6 millimeters.

10. The composition of claim 1, wherein the carbon fiber has a diameter of 3 micrometers to 10 micrometers.

11. The composition of claim 1, wherein the composition comprises carbon fibers having a tensile modulus of 28 to 48 megapounds per square inch (193 to 331 gigapascals).

12. The composition of claim 1, wherein the composition comprises carbon fibers having a tensile strength of 400 to 1,200 kilopounds per square inch (2,758 to 8,274 megapascals).

13. A method of forming an article, the method comprising three dimensional printing using the composition of claim 1.

14. An additively manufactured article formed using the composition of claim 1.

15. The additively manufactured article of claim 14, wherein the article exhibits a tensile strength in the z direction of at least 15 megapascals, as determined by a modified ASTM D 638 test method, wherein the z direction is the direction in which layers are added during an additive manufacturing process.

* * * * *